United States Patent
Ahmad et al.

(10) Patent No.: US 12,238,621 B2
(45) Date of Patent: Feb. 25, 2025

(54) METHOD AND WIRELESS UNIT FOR V2X COMMUNICATION

(71) Applicant: INTERDIGITAL PATENT HOLDINGS, INC., Wilmington, DE (US)

(72) Inventors: Saad Ahmad, Montreal (CA); Mahmoud Watfa, Saint Leonard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/107,912

(22) Filed: Feb. 9, 2023

(65) Prior Publication Data

US 2023/0188961 A1 Jun. 15, 2023

Related U.S. Application Data

(63) Continuation of application No. 16/089,252, filed as application No. PCT/US2017/025001 on Mar. 30, 2017, now abandoned.

(Continued)

(51) Int. Cl.
*H04W 4/40* (2018.01)
*H04L 41/5051* (2022.01)
(Continued)

(52) U.S. Cl.
CPC ........... *H04W 4/40* (2018.02); *H04L 41/5051* (2013.01); *H04W 4/06* (2013.01); *H04W 4/70* (2018.02); *H04W 4/80* (2018.02)

(58) Field of Classification Search
CPC ..... H04L 41/5051; H04L 45/74; H04L 47/15; H04L 47/806; H04W 4/06; H04W 4/40;
(Continued)

(56) References Cited

U.S. PATENT DOCUMENTS

| 2005/0043035 A1 | 2/2005 | Diesen et al. |
| 2005/0053062 A1 | 3/2005 | Kall et al. |

(Continued)

FOREIGN PATENT DOCUMENTS

| WO | 2015/142082 | 9/2015 |
| WO | 2016/108555 | 7/2016 |
| WO | 2016/148399 | 9/2016 |

OTHER PUBLICATIONS

CATT, "Discussion on V2X architecture," 3GPP TSG RAN WG2 Meeting #93, R2-161190, St. Julian's, Malta (Feb. 15-19, 2016).

(Continued)

*Primary Examiner* — Khoa Huynh
(74) *Attorney, Agent, or Firm* — Volpe Koenig

(57) ABSTRACT

A system and apparatus are disclosed herein for vehicle to everything (V2X) wireless communication. A V2X wireless transmit/receive unit (WTRU) may receive a vehicle to everything (V2X) message including configuration information and a road side unit (RSU) address. The WTRU may then transmit a message to the RSU according to the configuration information including multimedia broadcast multicast services (MBMS) data. The configuration information may include a MBMS service descriptor. One or more of the V2X messages may include priority information, WTRU type information, or both.

18 Claims, 13 Drawing Sheets

Related U.S. Application Data

(60) Provisional application No. 62/337,058, filed on May 16, 2016.

(51) Int. Cl.
  *H04W 4/06* (2009.01)
  *H04W 4/70* (2018.01)
  *H04W 4/80* (2018.01)

(58) Field of Classification Search
  CPC ........... H04W 4/42; H04W 4/44; H04W 4/46; H04W 4/70; H04W 4/80; H04W 28/0268
  See application file for complete search history.

(56) References Cited

U.S. PATENT DOCUMENTS

| | | | |
|---|---|---|---|
| 2014/0098745 | A1 | 4/2014 | Balasubramanian et al. |
| 2014/0267714 | A1* | 9/2014 | Mistry ............... H04N 21/8451 348/143 |
| 2015/0304122 | A1 | 10/2015 | Pazos et al. |
| 2016/0285935 | A1 | 9/2016 | Wu et al. |
| 2016/0337876 | A1 | 11/2016 | Ostrup et al. |
| 2017/0201461 | A1* | 7/2017 | Cheng .................. H04W 72/56 |
| 2017/0245245 | A1 | 8/2017 | Kim et al. |
| 2018/0049088 | A1 | 2/2018 | Shiga et al. |
| 2018/0077668 | A1 | 3/2018 | Chun et al. |
| 2018/0109937 | A1 | 4/2018 | Lee et al. |
| 2018/0115930 | A1* | 4/2018 | Belleschi .......... H04W 36/0072 |
| 2018/0206089 | A1* | 7/2018 | Cavalcanti ............ H04W 48/16 |
| 2018/0242385 | A1 | 8/2018 | Chandramouli et al. |
| 2018/0343644 | A1* | 11/2018 | Liu ....................... H04W 72/52 |
| 2019/0059019 | A1 | 2/2019 | Wallentin et al. |

OTHER PUBLICATIONS

Ericsson, "MBMS User Service Reference Architecture," 3GPP TSG-SA4#32, S4-040497 (Aug. 16-20, 2004).
Ericsson, "Traffic Management in V2X," 3GPP TSG-RAN WG2 #93, R2-161567, Malta (Feb. 15-19, 2016).
Huawei et al., "Priority handling based on ProSe Per Packet Priority," 3GPP TSG-RAN WG2 Meeting #91bis, R2-154548, Malmo, Sweden (Oct. 5-9, 2015).
Interdigital, "Evaluation of "HSS Initiated update for Dedicated CN Information/Redirection" & Conclusion," SA WG2 Meeting #114, S2-161450, Sophia Antipolis, France (Apr. 11-15, 2016).
Interdigital, "Local V2X Server Discovery," SA WG2 Meeting #115, S2-162732, Nanjing, P.R. China (May 23-27, 2016).
LG Electronics Inc., "Consideration on Scenario, Definition and Multiple Operators Aspect," 3GPP TSG-RAN WG3 Meeting #91, R3-160479, St. Julian's, Malta (Feb. 15-19, 2016).
LG Electronics, "Solution for Key Issue#2 (via eNB-type RSU)," SA WG2 Meeting #113, S2-160180, Saint Kitts, KN (Jan. 25-29, 2016).
Nokia, "local V2X server discover," TSG SA WG2 Meeting #114, S2-161691, Sophia Antipolis, France (Apr. 11-15, 2016).
Nokia, "V2X transmission via eMBMS—local V2X server discover," TSG SA WG2 Meeting #114, S2-161690, Sophia Antipolis, France (Apr. 11-15, 2016).
Qualcomm Incorporated et al., "V2X reference architecture and RSU discussion," SA WG2 Meeting #113, S2-160542, Saint Kitts, KN (Jan. 25-29, 2016).
Third Generation Partnership Project, "Technical Specification Group Services and System Aspects; Study on architecture enhancements for LTE support of V2X services (Release 14)," 3GPP TR 23.785 V14.0.0 (Sep. 2016).
Third Generation Partnership Project, "Technical Specification Group Services and System Aspects; Study on architecture enhancements for LTE support of V2X services (Release 14)," 3GPP TR 23.785 V0.3.0 (Apr. 2016).
Third Generation Partnership Project, "Technical Specification Group Services and System Aspects; Study on architecture enhancements for LTE support of V2X services (Release 14)," 3GPP TR 23.785 V0.2.0 (Feb. 2016).
Third Generation Partnership Project, "Technical Specification Group Services and System Aspects; Proximity-based services (ProSe); Stage 2 (Release 13)," 3GPP TS 23.303 V13.2.0 (Dec. 2015).
Third Generation Partnership Project, "Technical Specification Group Services and System Aspects; Proximity-based services (ProSe); Stage 2 (Release 13)," 3GPP TS 23.303 V13.3.0 (Mar. 2016).
Third Generation Partnership Project, "Technical Specification Group Services and System Aspects; Proximity-based services (ProSe); Stage 2 (Release 13)," 3GPP TS 23.303 V13.6.0 (Dec. 2016).
Third Generation Partnership Project, "Technical Specification Group Services and System Aspects; Proximity-based services (ProSe); Stage 2 (Release 14)," 3GPP TS 23.303 V14.1.0 (Dec. 2016).
Third Generation Partnership Project, "Technical Specification Group Services and System Aspects; Architecture enhancements for V2X services (Release 14)," 3GPP TS 23.285 V14.2.0 (Mar. 2017).
Third Generation Partnership Project, "Technical Specification Group Services and System Aspects; Service requirements for V2X services; Stage 1 (Release 14)," 3GPP TS 22.185 V14.0.0 (Mar. 2016).
Third Generation Partnership Project, "Technical Specification Group Services and System Aspects; Service requirements for V2X services; Stage 1 (Release 14)," 3GPP TS 22.185 V14.3.0 (Mar. 2017).
Third Generation Partnership Project, "Technical Specification Group Radio Access Network; Study on LTE-based V2X Services; (Release 14)," 3GPP TR 36.885 V1.0.0 (Mar. 2016).
Third Generation Partnership Project, "Technical Specification Group Radio Access Network; Study on LTE-based V2X Services; (Release 14)," 3GPP TR 36.885 V14.0.0 (Jun. 2016).
ZTE, "Considerations on eNB type RSU and UE type RSU," 3GPP TSG RAN WG2 #93, R2-161163, St. Julian's, Malta (Feb. 15-19, 2016).

* cited by examiner

METHOD AND WIRELESS UNIT FOR V2X COMMUNICATION

CROSS REFERENCE TO RELATED APPLICATIONS

This application is a continuation application of U.S. patent application Ser. No. 16/089,252 filed Sep. 27, 2018 which the U.S. National Stage, under 35 U.S.C. § 371, of International Application No. PCT/US2017/025001 filed on Mar. 30, 2017 which claims the benefit of U.S. Provisional Application Nos. 62/315,431 filed on Mar. 30, 2016, and 62/337,058 filed on May 16, 2016 the contents of which is hereby incorporated by reference herein.

BACKGROUND

The 3rd Generation Partnership Project (3GPP) has studied architecture to operate vehicle to everything (V2X) communications based on Long Term Evolution (LTE) systems. V2X service may be considered to be a type of communication service to exchange V2X messages that involves a transmitting or receiving wireless transmit/receive unit (WTRU) using a V2X application via 3GPP transport. V2X service may be further divided into vehicle to vehicle (V2V) service, vehicle to pedestrian (V2P) service, vehicle to infrastructure (V2I) service and vehicle to network (V2N) service.

SUMMARY

A system and apparatus are disclosed herein for vehicle to everything (V2X) wireless communication. A V2X wireless transmit/receive unit (WTRU) may receive a vehicle to everything (V2X) message including configuration information and a road side unit (RSU) address. The WTRU may then transmit a message to the RSU according to the configuration information including multimedia broadcast multicast services (MBMS) data. The configuration information may include a MBMS service descriptor. One or more of the V2X messages may include priority information, WTRU type information, or both. The WTRU type information may be directly mapped to the priority level of the V2X message. The priority with which the V2X message may be relayed by a relay WTRU is determined based on the WTRU type information and message type. The V1 interface between the application client in the V2X WTRU and the V2X Application Server (AS) may be used to request the RSU address associated with a particular geographic region or for a specific V2X service. The V2X message header may contain a broadcast number. The V2X message may be rebroadcast on a condition that the broadcast number is greater than zero. The V2X Application Server may send a list of MBMS Service area identities (IDs)/cell IDs to the broadcast multicast service center (BM-SC) for the service areas for which the downlink V2X message is intended.

BRIEF DESCRIPTION OF THE DRAWINGS

A more detailed understanding may be had from the following description, given by way of example in conjunction with the accompanying drawings wherein.

DETAILED DESCRIPTION

Figure 1A:
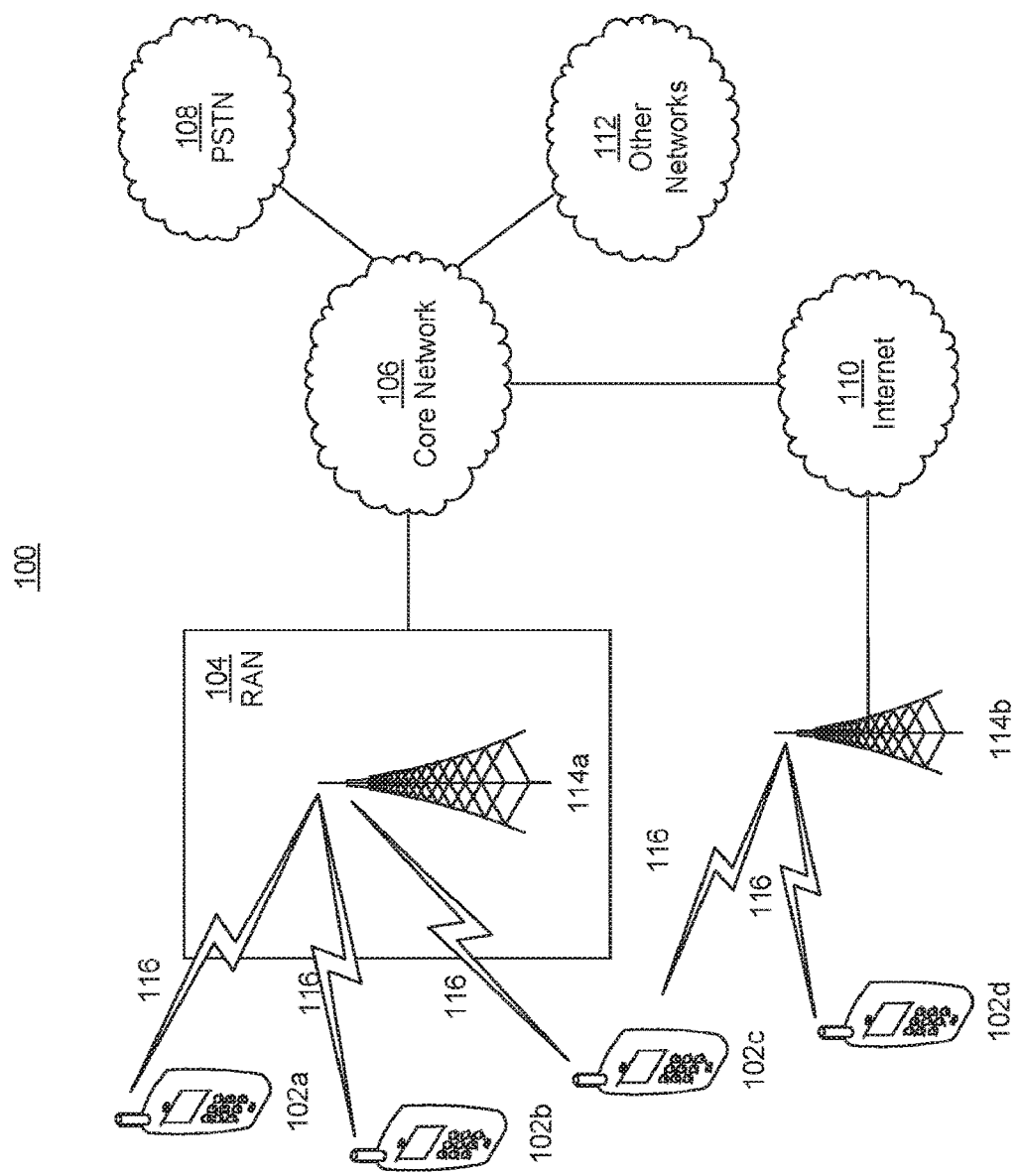
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless/wired transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless/wired signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, an infrastructure node, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
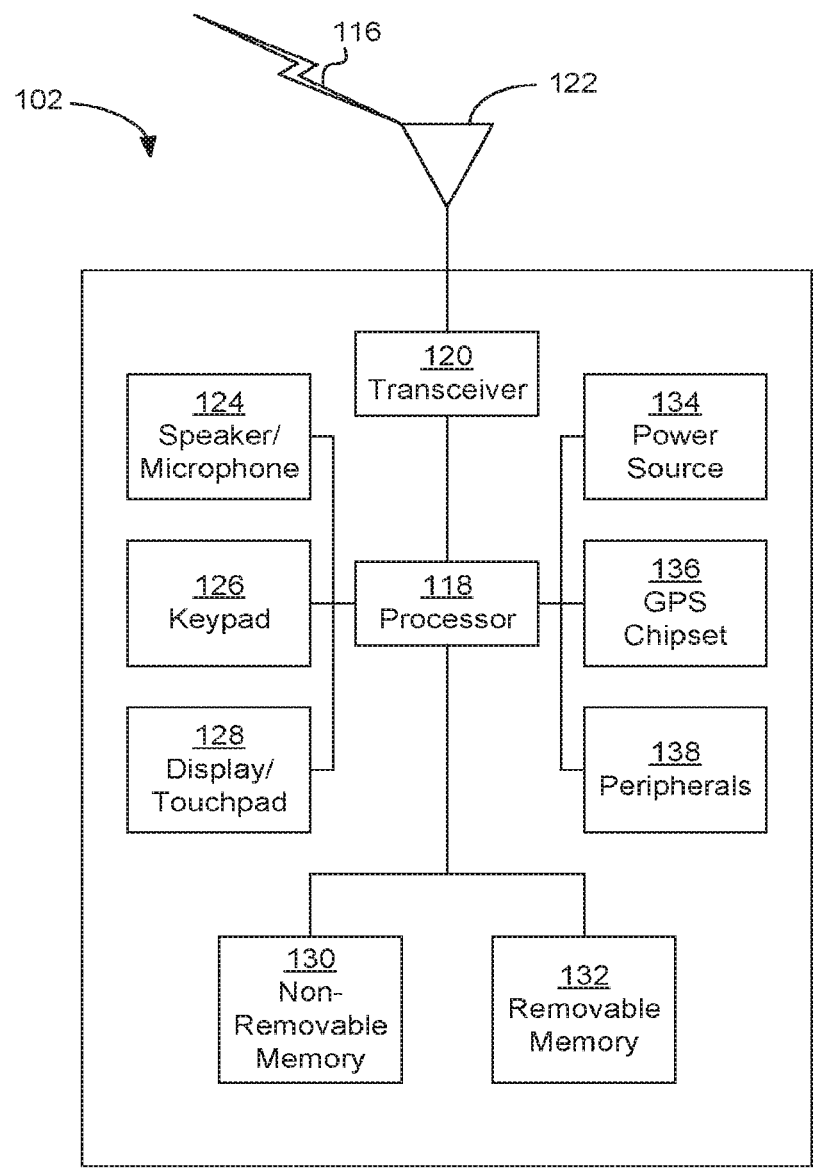
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/ touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
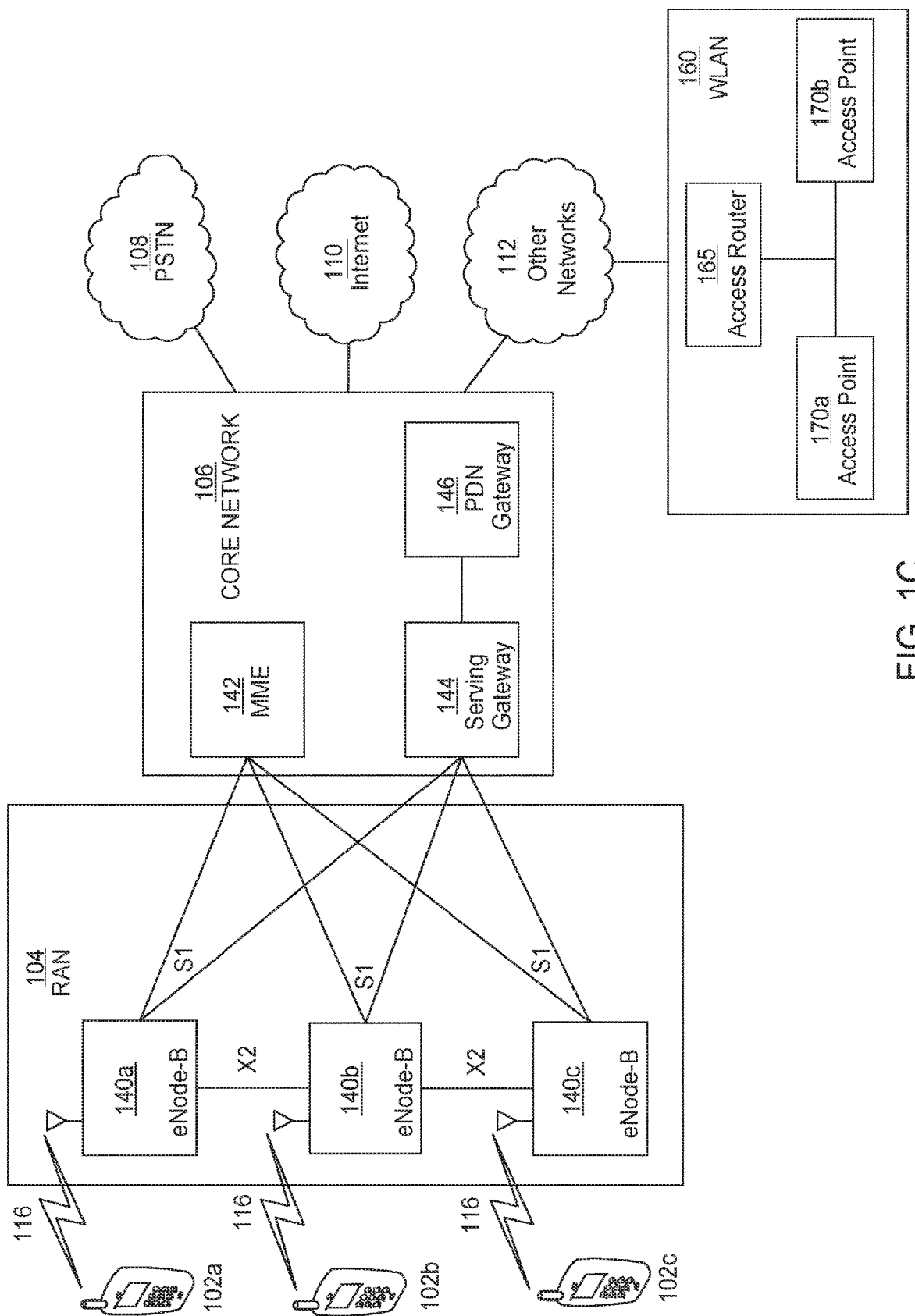
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Figure 2:
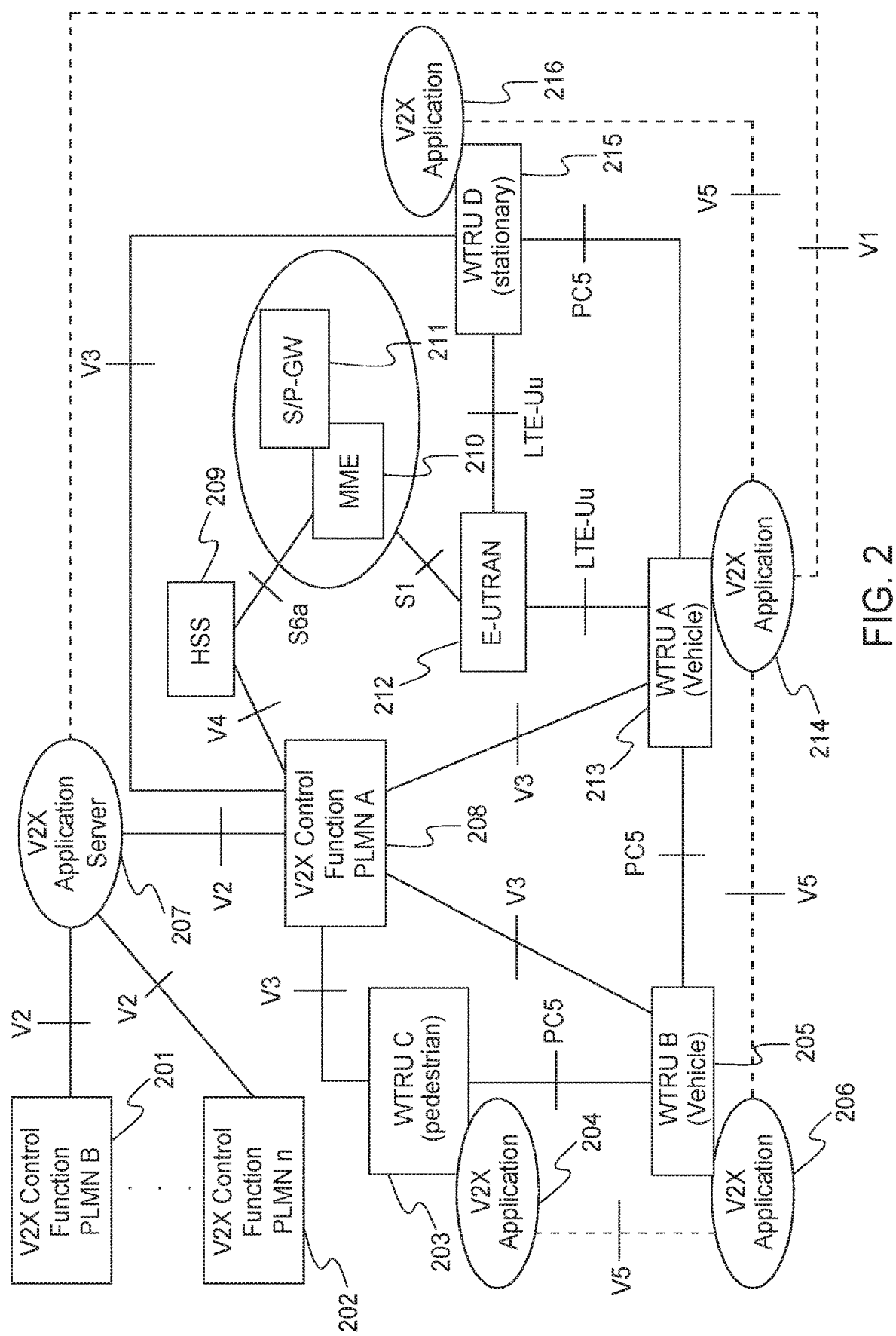
FIG. 2 is a system diagram of an example reference architecture for vehicle to everything (V2X) communication.

V2X (vehicle to everything) communication may be employed in various architectures to enable communication of a vehicle to another point/node in a network. One possible embodiment as shown in FIG. 2 has a V2X architecture based on proximity service (ProSe) PC5 architecture. In another embodiment shown in FIG. 3 a V2X architecture may be based on enhanced multimedia broadcast multicast services (eMBMS).

In the example of FIG. 2 the architecture may have a V2X Control Function for a public land mobile network PLMN A operator 201 connected via a V2 reference point to a V2X Application Server (AS) 207. There may be other V2X Control Function PLMN B 201, or any number n V2X Control Function PLMNs 202 that connect to the V2X Application Server 207. The V2X Application server 207 may host/run a V2X application 214. The V2X Control Function PLMNs 202 may serve as an intermediary between a WTRU 205 and the V2X Application server 207. The WTRU 205 may be a vehicle. Another WTRU 205 or WTRU 213 may be in or a part of a vehicle. Another WTRU 203 may be operated and/or carried by a pedestrian. Another WTRU 215 may be stationary, like a Road Side Unit (RSU). Each WTRU 203, 205, 206, 213, or 215 may run a V2X application 204, 206, 214, or 216 respectively. The EPC components may include a HSS 209, MME 210, S/P-GW 211, a the E-UTRAN 212 and may facilitate communication with the various WTRUs 203, 205, 206, 213, or 215. V2 may be a reference point between a V2X application and a V2X Control Function. V3 may be a reference point between a V2X enabled WTRU and a V2X Control Function. V4 may be a reference point between an HSS and a V2X Control Function. V5 may be a reference point between V2X applications. LTE-Uu may be a reference point between a V2X enabled WTRU and an E-UTRAN. PC5 may be a reference point between V2X enabled WTRUs Vehicle to Vehicle, Vehicle to Infrastructure, or Vehicle to Pedestrian communications.

Figure 3:
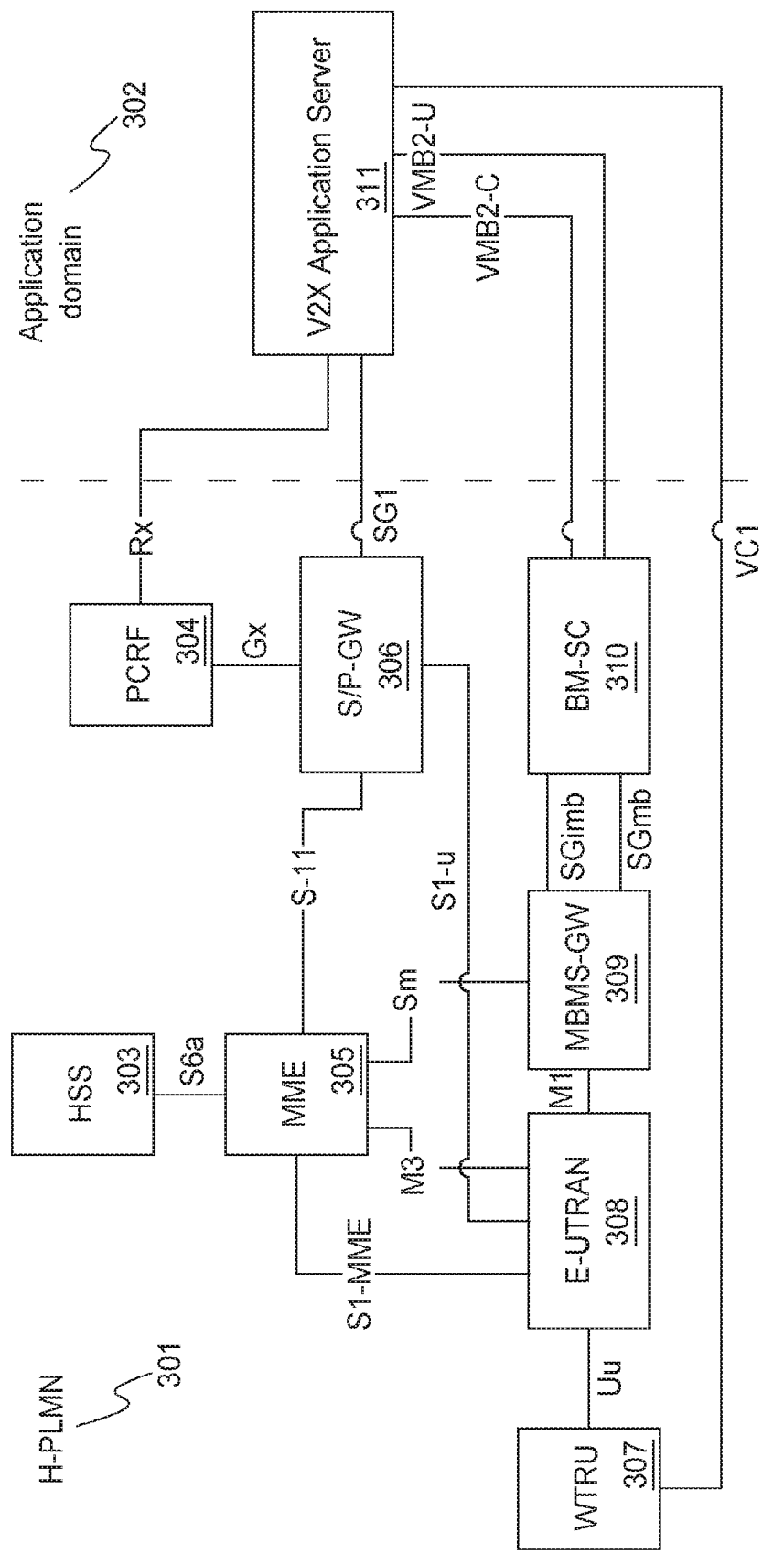
FIG. 3 is a system diagram of an example reference architecture for V2X communication based on evolved multimedia broadcast multicast services (eMBMS)

FIG. 3 shows an example system diagram of a reference architecture for V2X communication based on evolved multimedia broadcast multicast services (eMBMS). In this example transmission, reception, or both of V2X messages may occur facilitated by an eMBMS architecture. The broadcast multicast service center (BM-SC) 310 may provide membership, session and transmission, proxy and transport, service announcement, security, and content synchronization. The BM-SC 310 communicates with the V2X Application Server 311 as the source of content for a multicast. An EPC may include an HSS 303, MME 305, S/P-GW 306, and E-UTRAN 308 to facilitate communication over LTE for the V2X messages. A MBMS gateway (GW) 309 may perform MBMS session control signaling towards the E-UTRAN 308, and sometimes via an MME 305. Alternatively/additionally the MBMS GW 309 may distribute user plane data to eNBs part of the EPC using IP multicast. The E-UTRAN 308 communicates with a V2X enabled WTRU 307. There may be a plurality of V2X WTRUs 307 and they may be a mixture of vehicles, pedestrians, or RSUs. A policy and charging rules function (PCRF) 304 may be connected to the S/P-GW 306 and/or the V2X Application Server 311. Elements on the left side of the dotted line may be part of a H-PLMN 301 and the elements on the right side of the dotted line may be part of an Application Domain 302. M1 may be a reference point between a MBMS GW and a E-UTRAN for MBMS data delivery where IP multicast may be used to forward data. M3 may be a reference point for the control plane between the MME and the E-UTRAN. Sm may be a reference point for the control plane between MME and the MBMS-GW. SGi-mb may be the reference point between BM-SC and the MBMS-GW function for MBMS data delivery. SGmb may be the reference point for a control plane between the BM-SC and the MBMS GW. Uu may be a reference point between a V2X enabled WTRU and an E-UTRAN. A Rx is an interface between application function (AF) and PCRF. A Gx is an interface between PCRF and PGW. A S6a is an interface between MME and HSS. A VMB2-C is a control plane interface between V2X application server and BMSC. A VMB2-U is a user plane interface between V2X app server and BMSC.

Figure 4:
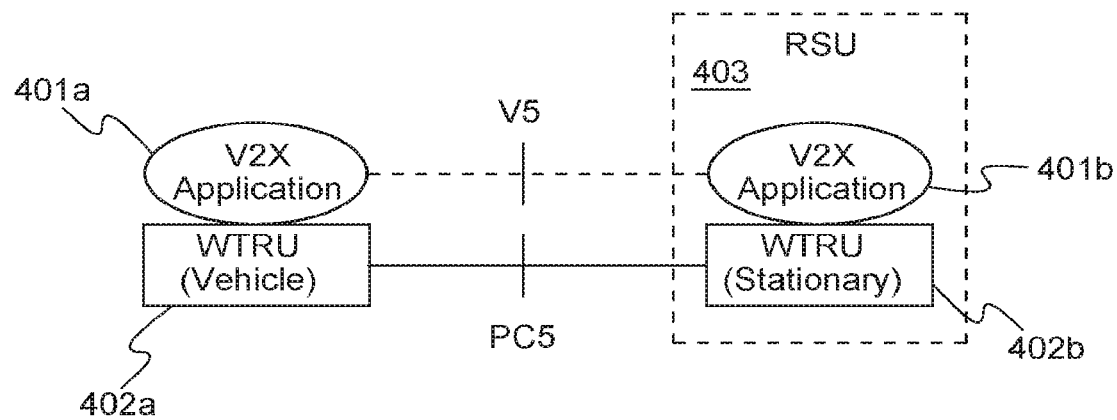
FIG. 4 is a system diagram of an example of V2X operation including a WTRU based road side unit (RSU)

FIG. 4 is a system diagram of an example of V2X operation including a WTRU based RSU. A V2X Application 401a operating on a WTRU 402a. In one example the WRTU 402a is a part of or connected to a vehicle. The RSU 403 may include at least a V2X application 401b operating on a stationary WTRU 402b or a new standalone functional entity. A PC5 reference point may connect WTRU 402a and WTRU 402b and a V5 reference point may connect the two instances of the V2X applications 401a and 401b.

Figure 5:
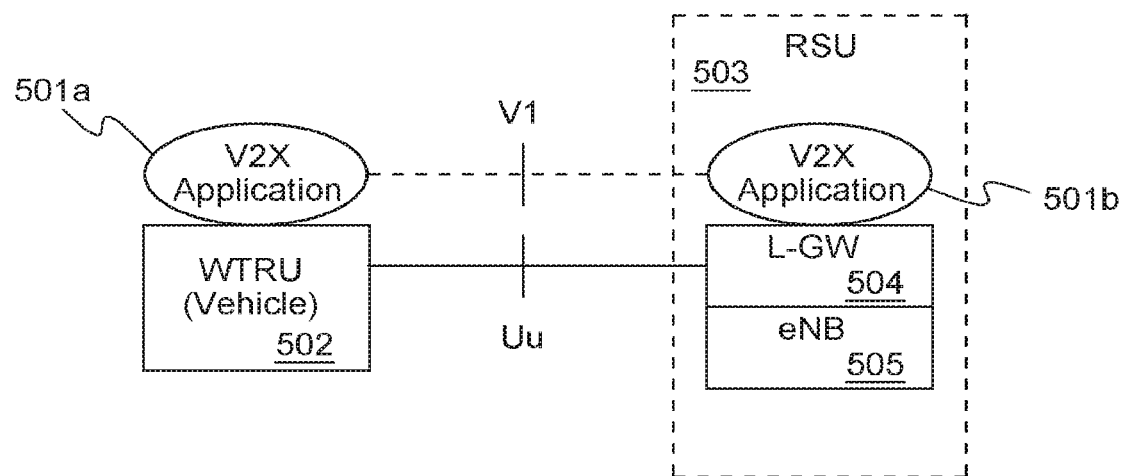
FIG. 5 is a system diagram of an example of V2X operation including an eNode-B based RSU.

FIG. 5 is a system diagram of an example of V2X operation including an eNode-B based RSU. While similar to the example shown in FIG. 4 in that a V2X application 501a operates on a WTRU 502, FIG. 5 differs in that the RSU 503 may contain an eNode-B 505 operating a V2X application 501b connected to a local gateway (L-GW) 504. A Uu reference point may connect the eNB 505 to the WTRU 502 and a V1 reference point may connect the two instances of the V2X application 501a and 502b.

Figure 6:
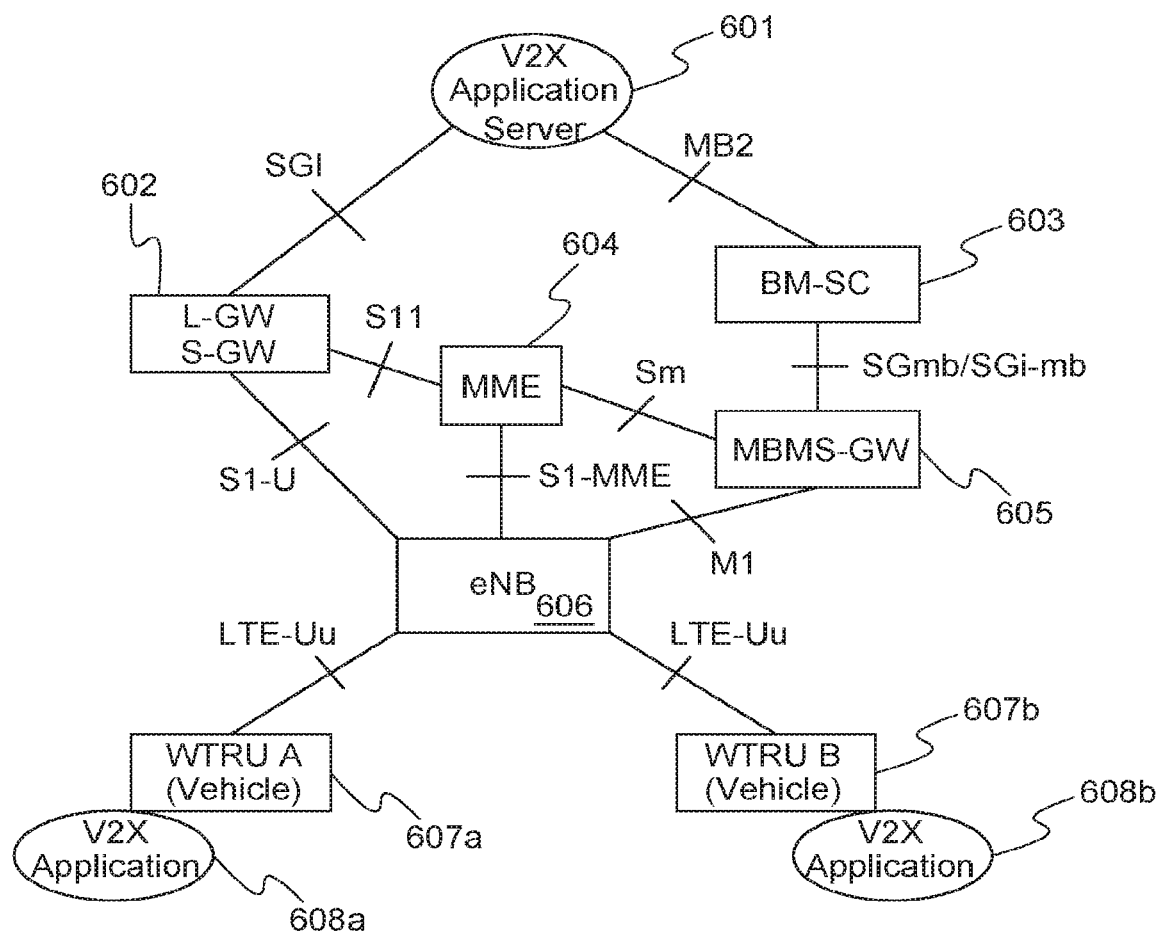
FIG. 6 is a system diagram of an example of local network architecture for V2X services.

FIG. 6 is a system diagram of an example of local network architecture for V2X services. FIG. 6 is similar to the example shown in FIG. 3 in that it may utilize an MBMS architecture. The BM-SC 603 may provide membership, session and transmission, proxy and transport, service announcement, security, and content synchronization. The BM-SC 603 may communicate with the V2X Application Server 601 as the source of content for a multicast. The L-GW/S-GW 602 may communicate with the V2X Application Server 601 to assist distributing a V2X broadcast to the MME 604 and/or eNB 606. A MBMS GW 605 may distribute user plane data to eNB 606, sometimes via the MME 604. The eNB 606 communicates with a V2X enabled WTRU 607a and/or 607. There may be a plurality of V2X WTRUs 307 and they may be a mixture of vehicles, pedestrians, or RSUs. M1 may be a reference point between a MBMS GW and an eNB for MBMS data delivery where IP multicast may be used to forward data. M3 may be a reference point for the control plane between the MME and the E-UTRAN. Sm may be a reference point for the control plane between MME and the MBMS-GW. SGi-mb may be the reference point between BM-SC and the MBMS-GW function for MBMS data delivery. SGmb may be the reference point for a control plane between the BM-SC and the MBMS GW. LTE-Uu may be a reference point between a V2X enabled WTRU and an eNB. A S1-U is a userplane interface between eNB and SGW. A S1-C is a control plane interface between eNB and MME. A MB2 is an interface between application server and BMSC. A S11 is an interface between S-GW and MME.

Figure 7:
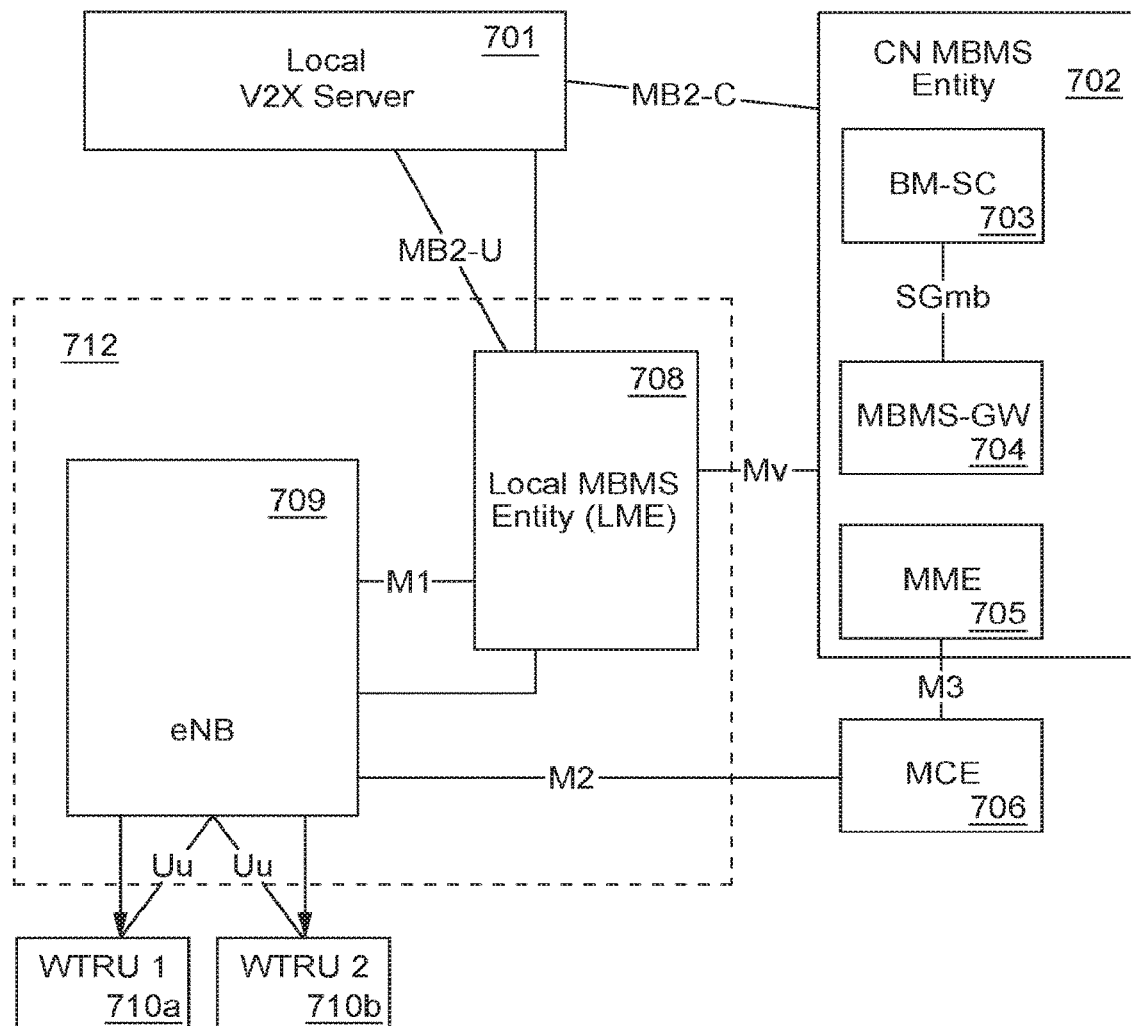
FIG. 7 is a system diagram of an example of local multimedia broadcast multicast services (MBMS) network architecture for V2X services.

FIG. 7 is a system diagram of an example of local MBMS network architecture for V2X services with a Local MCMS Entity (LME) 708. As seen in FIG. 7, the user plane related MBMS functions, such as, for example, the user plane functions of a BM-SC and the MBMS gateway (MBMS-GW) may be moved closer to the RAN 712 than FIG. 6 since these functions would be internal to the LME 708. LME 708 may contain similar functions as the core network (CN) MBMS Entity 702. V2X messages may be distributed to target eNBs 709, and ultimately to a WTRU 710a and 710b. The WTRU 710a and 710b may be a pedestrian, a vehicle, or a RSU. By having an architecture with an LME 708, V2X messages may be sent without traversing the core network nodes, for example, the BM-SC 703, MBMS-GW 704, and the MME 705. The control plane may remain at the main MBMS nodes, i.e. BM-SC 703, MBMS-GW 704 and MME 705 in the CN MBMS Entity 702. Further, the LME 708 may host the necessary functions to transmit the data received directly from the Local V2X Server 701 to eNB 709 via M1 reference point (e.g., SYNC function, IP multicast distribution function and the like). The Multi Cell Coordination Entity (MCE) 706 may facilitate a connection between the CN MBMS Entity 702 and the eNB 709. M1 may be a reference point between an MBMS GW and an eNB for MBMS data delivery where IP multicast may be used to forward data. M3 may be a reference point for the control plane between the MME and the MCE. M2 may be a reference point between an eNB and the MCE. SGmb may be the reference point for a control plane between the BM-SC and the MBMS GW. LTE-Uu may be a reference point between a V2X enabled WTRU and an eNB. A M2 is an interface between the MCE and eNB. A MB2-C is a control plane interface between BMSC and application server. A My is a new proposed interface between MBMS-GW and LME.

In one embodiment for a V2X communication system, configuration information may be used to enable V2X services. For a V2X WTRU to be able to access various V2X services it may need to be properly configured with various parameters by the network. The configuration information may either be pre-configured in the WTRU, sent by the V2X Control Function, V2X Application Server, or the multiple network nodes, e.g., an eNB or MME. By ensuring that V2X WTRUs are properly configured, a V2X communication system may enable the exchange of messages to and from a WTRU in a variety of situations, such as: when the WTRU is roaming and not-roaming; when the WTRU is served by an Evolved UMTS Terrestrial Radio Access Network (E-UTRAN) and when the WTRU is not served by an E-UTRAN; and when certain messages need to be prioritized to meet latency requirements.

Configuration information/parameters may be required to enable V2X services. The network may have to provide certain configuration parameters to the WTRU for the WTRU to be able to communicate to the network. Such configuration parameters may be pushed or facilitated by various network nodes including, but not limited to, an Access Network Discovery and Selection Function (ANDSF), a ProSe Function, an MME, an eNB and the like. The V2X WTRU may receive one or more configuration parameters from the aforementioned nodes and the V2X Control Function via a V3 interface, such as the V3 interface shown in FIG. 2.

Configuration information/parameters may depend on the local network architecture, such as but not limited to the example network architectures as described herein. In the following examples, a V2X WTRU connects to a local network and receives configuration information/parameters associated with the local network architecture.

In one example, the V2X WTRU may be provided with an access point name (APN) of the local network for V2X communication. The V2X WTRU may use this APN information to request PDN connectivity to the local network which is designated for various V2X commination scenarios. The V2X WTRU may be configured with multiple APNs for different types of V2X communication, e.g., a specific APN for V2X safety communication and a different APN for non-safety communication.

In another example, the V2X WTRU may be provided with an LGW address or local home network (LHN) identity. The V2X WTRU may provide this information to the network (eNode-B, MME and the like) to facilitate the selection of the gateway responsible for the desired V2X communication.

In another example, the V2X WTRU may be provided with relay node information, such as a user information ID, a relay service code, a Layer 2 address, a Group ID and the like. The information of the relay node may be configured for both within E-UTRAN coverage and out of E-UTRAN coverage operation.

In another example, the V2X WTRU may be provided with a V2X Application Server address. Such information may include an address (for example, an IP address, a host name, a uniform resource identifier (URI) and the like) of V2X Application Server(s) for a particular V2X application.

In another example, the V2X WTRU may be provided with an address of the RSU(s). This address may be a specific broadcast address (Layer2 ID) which indicates that the message is directed for an RSU. Alternatively, the WTRU may be configured with RSU prefix(es) suggesting that the destination of the message is an RSU (either WTRU based or eNode-B based).

In another example, the V2X WTRU may be provided with geographic area information to be able to broadcast or disseminate the message(s) which are only relevant to a certain region. For example, the V2X WTRU may be provided with a broadcast number that may indicate the number of times the message should be rebroadcasted.

In another example, the V2X WTRU may be provided with QoS parameters for V2X operations. The QoS parameters may include, for example: mapping information from application level priority to V2X priority, bit rate information, QoS Class Indicator (QCI), PPPP value and the like. The QoS parameters may also be configured. In one instance, QoS and priority parameters may be assigned on a per V2X message basis (e.g., safety or non-safety). Also, different parameter sets may be configured for control messages and V2X data messages. In another instance, the V2X WTRU may be provided with TMGI or other MBMS service area ID (SAI) related information for V2X devices supporting MBMS architecture and receiving V2X messages via an MBMS broadcast.

The information or parameters described in the non-limiting examples above may be sent by the V2X Control Function, V2X Application Server, or other network nodes. These network nodes may send such information/parameters to the V2X WTRU before the start of the communication or during the V2X communication. Management objects (MOs) may be employed by the network nodes to push certain information to the V2X WTRU. In a case where the network employs MOs to send information to a WTRU, the WTRU may provide the MO information to the V2X layer in the protocol stack. In some cases the V2X layer in the WTRU may be the same or similar to the ProSe protocol layer. In alternative communication cases, the configuration information/parameters may be sent to the WTRU by the network (per a V2X Control Function) upon request from the WTRU. The WTRU may transmit a request message to the V2X Control Function before communication initiated or during the V2X communication.

In a V2X communication system, certain V2X messages may receive priority handling. Under 3GPP ProSe, ProSe Per Packet Priority (PPPP) may be defined such that the application layer assigns 8 different priority levels to every packet sent from the application layer in the WTRU to the Access Stratum layer. The Access Stratum layer may then queue/transmit the packets within the WTRU based on the received priority level or PPPP from the upper layers. V2X messages may be prioritized based on message type, such as safety messages prioritized over non-safety messages. V2X messages may also be based on the type of WTRU that is sending the message (e.g., ambulance, patrol car and the like). Priority handling procedures may be required for V2X communication over the Uu interface because current PPPP mechanisms only apply to PC5 communication (direct WTRU to WTRU communication) but in the case of V2X, per message priority may be applicable to Uu (LTE radio) transmissions, such as when safety messages have to be prioritized over non-safety messages.

As used herein, the application layer may include other higher layers, including but not limited to one or more of a V2X facilitation layer, a V2X messaging layer (used by, for example, signal phase and timing (SPAT) and other V2X protocols), and/or a Transport layer (used by, for example, a protocol such as wireless access for vehicular environment (WAVE) short message protocol (WSMP)).

The application layers or higher layers may provide some indication of the priority of the V2X message to the lower layers or 3GPP protocol stack (for example, a V2X layer, a ProSe protocol layer or an Access Stratum layer) similar to the per packet priority concept. The application level priority may be used as an input by the 3GPP protocol to determine the final message priority for the PC5 link or the Uu link. The application level priority may be used in one or more of the following ways.

In one example, the per message priority indicated by the application layer may be directly mapped to the 3GPP priority, such as the PPPP or logical channel ID based on the mapping rules received in the configuration information. Also, the ProSe protocol layer or V2X protocol layer may check the authorization information/configuration information to get the WTRU status/type (e.g., whether the WTRU is an RSU or whether the WTRU is an ambulance or a police patrol car). Based on this authorization check, the application level priority received from the upper layers may be upgraded or downgraded by the V2X (ProSe) protocol layer. For example, if the application level sends a PPP value of 4 for a particular message, the priority of this message may be upgraded to a PPP value of 2 if the authorization check indicates that the WTRU type is a police patrol car. The ProSe protocol layer and the V2X protocol layer are example protocol layers which may implement the described functionality; however, such functionality may also be implemented in other 3GPP layers, e.g., the Access Stratum.

For WTRUs in coverage, the priority of various V2X messages, particularly safety messages, may be determined using assistance from the eNode-B/MME insofar as the network may provide priority levels for specific safety messages via system information block (SIB) broadcast by the eNode-B. Alternatively, the priority levels may be provided via the V3 (PC3) interface as part of configuration information (as described elsewhere herein) or as a direct V3 control message exchange between the V2X WTRU and the V2X Control Function. The determination of the final priority may be based on a combination of application level priority and priority levels provided by the network. Alternatively, the network may inform a WTRU whether network based priority levels should be employed rather than priority levels received from the application layer. In such a case, the WTRU may ignore the application level priority and transmit messages based on priority levels received from the network.

In one example, the relay WTRU may be an L3 router meaning that the relay WTRU may not be aware of the contents of the V2X message or the type of the V2X message. The relay WTRU may therefore need a mechanism to forward the message to other WTRUs and/or the network with the appropriate priority. The relay WTRU may use a ProSe priority PPP to QCI mapping mechanism to transmit the message to the network in the uplink direction over the Uu interface. In one instance, the relay WTRU may determine priority when the message is relayed to other WTRUs. In another instance, a priority determination mechanism as defined elsewhere herein may also be applicable to a relay WTRU.

One method to facilitate the relay WTRU in determining the priority of the V2X message may be to include the Message type information included in the header of the V2X message. The message type information may consist of a few bits representing the category of the message. Some of the categories may include various safety messages (e.g., accident broadcast, road blockade and the like) and other categories may include traffic status messages. Message type fields may also be used for non-safety messages. Infotainment services may be an example that fits the criteria of non-safety messages. The initiating WTRU may include such type information in the header of the message. Upon receiving the V2X message, the relay WTRU may look for message type information to determine the priority to forward this message accordingly. The priority may be determined by a simple mapping of the message to a priority level or in combination with other parameters which are described elsewhere herein. The message header as discussed herein may be the IP header, packet data convergence protocol (PDCP), radio link control (RLC) or medium access control (MAC) header.

An initiating WTRU may also include the WTRU type or similar information in the header of the V2X message for priority reasons. As mentioned earlier, the WTRU type information may describe certain properties of the WTRU which is transmitting or broadcasting the V2X message. Police patrol car, fire engine, safety officer and the like are some of the examples of WTRU types which may be included in the V2X message header that have some priority. The WTRU type information may be preconfigured in the WTRU or the initiating WTRU may receive this information from the application layer/server or the V2X control layer/ProSe layer in the WTRU. When the relay WTRU receives the V2X message, it may look for the WTRU type field in the header of the message to be able use it as an input to decide on the priority for forwarding of the message. The WTRU type information may be either directly mapped to the priority level of the V2X message or may be used in conjunction with other parameters such as message type to determine the priority with which the message may be relayed by the relay WTRU.

The relay WTRU may also be able to determine the message priority from the L2 address or IP address used for PC5 communication. If such a procedure is employed, a relay may have certain configured information usable to map the broadcast address used for PC5 communication to a certain priority level. Such information may be in the form of message type or WTRU type. In other words, certain broadcast addresses may be used for particular messages or specific WTRU types by the initiating WTRU. Looking for such broadcast addresses in the PC5 message, the relay WTRU may be able to glean either the message type, WTRU type, or both. Alternatively, there may be a direct mapping between the broadcast address and priority level that may be configured at the relay WTRU.

V2X communication may use per message priority over the Uu interface. The characteristics of a V2X system requires that every message transmitted may have a different priority due to the various urgency levels of different messages. Traffic broadcast messages may have lower priority compared to safety messages as an example. Even within the category of safety messages there may be variable priorities depending on the nature of a message or the situation/incident that results in the transmission of a V2X message.

Per packet priority or per message priority may also be applicable to an entire V2X system, including message transmission over the Uu interface (e.g., the direct air interface between the WTRU and the eNode-B). As discussed herein, there may be a mechanism for exchange of a PPP or PMP between a V2X Application Server and the V2X WTRU. Such priority may be applied by the V2X WTRU for messages transmitted over the Uu interface. Applying these concepts to the example of FIG. 6, a mechanism may be used for the LGW/eNB system to receive the PMP to be applied by any one of the nodes as shown in FIG. 6 in the downlink direction (from the V2X Application server 601 to the WTRUs 607a or 607b). The V2X Application Server 601 may send a PMP or PPP to the LGW 602 via the SGi interface to be applied for the messages in the downlink direction. In case of a MBMS architecture for multicast/broadcast transmission of V2X messages, the V2X Application Server 601 may send the PPP or PMP over a MB2 interface. Once the LGW 602 receives a message with a particular PPP level, it may forward the message with the PPP/PMP or priority level to the eNB 606 over the S1-U interface. The eNB 606 may then use the PMP or PPP to schedule the messages in such a way that messages with higher priority are sent first to the WTRU 607a or 607b in the downlink direction over the LTE-Uu interface. While an example was provided applying the priority mechanism to the example architecture of FIG. 6, the priority mechanism may be applied to any architecture, including other architectures as discussed herein.

For PPP to be applied in the UL direction, the V2X application in the WTRU may receive priority levels for every message from the V2X Application Server. The application layer in the WTRU may pass the PPP along with the message to the access stratum or the lower layers. The lower layers may schedule the message over the Uu interface according to the received PPP value from the upper layers. Note that a PPP/PMP value received by the lower layer for Uu transmission may be different than a parameter used for PC5 transmission. This may enable the WTRU to differentiate whether the received PPP is to be applied to the corresponding Uu or PC5 transmission.

A similar transfer of priority level, as compared to the V2X priority message example processes based on the L-GW architecture discussed herein, may be applied to the MBMS architecture in the downlink (DL) direction.

In the alternative, a PPP value or a range of PPP values may be included in the policy control and charging (PCC) messages sent from the policy control and charging rules function (PCRF) to the GW during the setup of a selective IP traffic offload (SIPTO) PDN connection between the WTRU and the LGW or during the update of a SIPTO PDN connection. The LGW may apply these PPP values in the downlink direction as described elsewhere herein.

The WTRU may also receive PPP values during the setup or update of the connection for the uplink (UL) transmission. The MME may send the PPP value(s) to the WTRU in the non-access stratum (NAS) message. Further, the MME may receive these PPP values from the L-GW/S-GW over the S-11 interface.

In a V2X communication system, the transmission and/or reception of V2X messages may be made between two WTRUs such as a vehicle and a RSU. For example, a V2X message may be transmitted from a vehicle to an RSU, where the vehicle has a WTRU. An RSU can transmit a V2X message to a vehicle or distribute a V2X message to multiple vehicles. In some scenarios, the V2X message may be forwarded from an RSU to other RSU(s). To support V2X message transmission/reception between a vehicle and an RSU for V2X, processes must be made to enable vehicles to determine that a message needs to be sent to a RSU instead of another vehicle/pedestrian. From an RSU's perspective, the process can either forward the message to a vehicle, another RSU, or a V2X Application Server. In such cases, procedures have to be outlined for an RSU to be able to make the appropriate forwarding decision. Furthermore, the vehicle may either send unicast or broadcast messages to the RSU and then the RSU may either send a unicast message to the same or a different vehicle or send a broadcast message to different WTRUs. In one scenario, the addressing scheme for various unicast/broadcast communication to/from the vehicle or to/from the RSU may be addressed herein so that messages can be sent to or received by the intended recipients in a V2X communication system. Any reference to vehicle in the above discussion could also be a WTRU embodied in another form factor/use such as pedestrian.

A V2X message for vehicle to infrastructure (V2I) service(s) may be transmitted from a vehicle to an RSU. An RSU may also transmit a V2X message for V2I service(s) to a vehicle or distribute a V2X message for V2I service(s) to other vehicles. In some of these cases, the V2X message may be forwarded from an RSU to other RSU(s).

Figure 8:
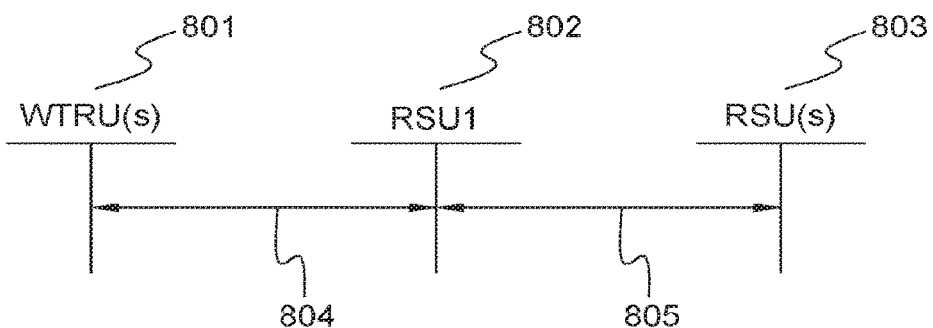
FIG. 8 is a system diagram of example RSU communication scenarios.

FIG. 8 is a system diagram of an example RSU communication scenario. In this example a WTRU may be a vehicle, a pedestrian, or other non-RSU embodiments. Looking at FIG. 8 there may be two scenarios: 1) communication 804 between one or more WTRUs 801 and an RSU1 802, and 2) communication 805 between the RSU1 802 and other RSU(s) 803. In either scenario the communication may either be PC5 communication or Uu communication in unicast, multicast, or broadcast form.

Communication with a RSU may happen via the PC5 interface, such as shown in in FIG. 4. Also, such communication may be unicast, multicast, or broadcast depending on the application or the communication scenario. A signal phase and timing (SPAT) application, for example, may use unicast communication between the vehicle and the RSU, whereas a traffic status application or protocol may use broadcast communication from the RSU to the WTRU.

For any V2X communication scenario, PC5 messages may need to be sent to a particular destination with an L2 address and/or a particular IP address. The L2 destination address may be included in the PDCP header. These addresses may be assigned to the WTRU at a configuration stage or upon request from the WTRU-type RSU over the V3 interface between the RSU WTRU and the V2X Control Function. The procedures described herein may assume that a WTRU-type RSU has been assigned or preconfigured an L2 address and/or/IP address and/or Application Server, which may be there after referred to as an RSU address. The procedures may also assume that a V2X Control Function is cognizant of the RSU address in certain scenarios.

The example procedures described herein may be executed when the WTRU, such as a vehicle, enters a new area (such as, for example, a new geographic area) and may contact or receive messages from the RSUs in that area. The procedures may also be executed when the vehicle changes its public land mobile network (PLMN) and the vehicle does not have the authorization to access RSUs in that PLMN or the vehicle does not have the address of the RSU in the new PLMN. Interaction between a home PLMN (HPLMN) V2X and visited (VPLMN) V2X may occur in these examples, that is, in the case of the inter-PLMN RSU address procedure.

The V1 interface between the application client in a V2X WTRU and the V2X Application Server may be used to request the RSU address in a particular geographic region or for a specific V2X service. Upon receiving the request from the WTRU, the V2X Application Server may contact the V2X Control Function responsible for the location that the WTRU is in or the PLMN that the WTRU is camped on. The respective V2X control may in turn send the RSU address or prefix(es) to the V2X Application Server over the V2 interface after optionally performing the authorization check with the home subscriber server (HSS). The V2X Application Server may then forward the RSU address to the V2X WTRU.

Figure 9:
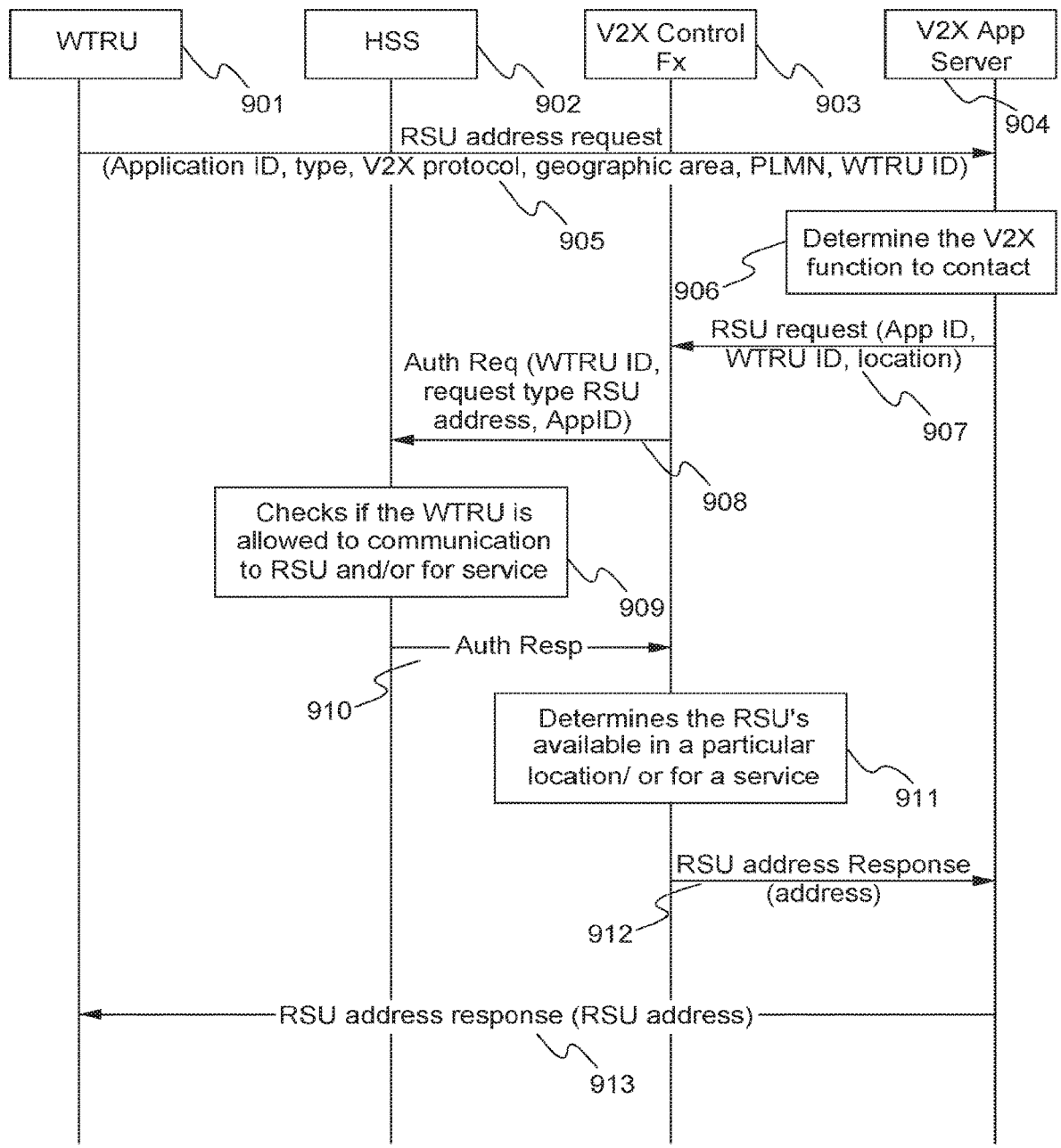
FIG. 9 is a diagram of an example V1 procedure to acquire an RSU address.

FIG. 9 is a diagram of an example V1 procedure to acquire an RSU address. At 905 the V2X WTRU 901 may send an application level message to the V2X Application Server 904 over a V1 interface to request an RSU address. The message may contain one or more of: an application ID, a WTRU ID, an application type, a V2X protocol type (e.g., SPAT), information about a geographic area the WTRU 901 is located in, the PLMN the WTRU is camped on, an indication about a home operator, and other related information.

At 906, based on the received information from the V2X WTRU 901, the V2X Application Server 904 may decide which V2X function to contact to get an RSU address. This determination may be based on the WTRU's location, the service the WTRU is trying to access, the WTRU's home PLMN or the PLMN the WTRU is registered in.

At 907 the V2X Application Server 904 may send the RSU address request to the V2X Control Function 903 to retrieve the RSU address the WTRU 901 is interested in. This RSU address request may be a V2 interface message which may contain WTRU ID, information about the application (e.g., App ID), WTRU location information and the like.

At 908, the V2X Control Function 903 may perform an authorization check with the HSS 902 to confirm if the WTRU 901 is allowed to connect to a particular RSU. An Authorization Request (which may include WTRU ID, request type (RSU address request), App ID etc.) message may be sent to the HSS 902 by the V2X Control Function 903.

At 910, the HSS 902 may check if the WTRU 901 is allowed to communicate with the RSU and/or the HSS 902 may check if the WTRU 901 is allowed to access the requested service. At 910, the HSS 902 may respond back to the V2X Control Function 903 with an Authorization Response message.

If the request is authorized by the HSS 902, the V2X Control Function 903 may then determine at 911 the RSU which can meet the required parameters received by the V2X Control Function 903 at 907. At 912, the V2X Control Function 903 may respond to the V2X Application Server 204 with an RSU address response message which may include the required RSU address. The RSU address may then be sent to the WTRU 901 in a V1 interface response message at 913 by the V2X Application Server 904.

In an alternative scenario, the process described with relation to FIG. 9 may differ by performing fewer or additional actions. For example, a V2X Control Function may decide not to perform authorization with an HSS. Once the V2X WTRU receives the RSU address, this address may be used by the WTRU as a destination address in a PC5 message for a particular RSU.

In another alternative, when a WTRU receives the source address of a RSU, the V2X WTRU may filter out all the received PC5 broadcast messages based on the received source RSU address. The WTRU may only pass on the PC5 message to the upper layers whose source address matches the RSU source address as previously received.

In another alternative, a WTRU may request an RSU address from a V2X Control Function over a V3 interface. Upon receiving the request from the WTRU, the V2X Control Function may contact the V2X Application Server based on the information in the received V3 interface message from the WTRU. The V2X Application Server may then inform the V2X Control Function if the V2X WTRU is allowed to access the particular service or RSU providing that provides that service. If this check is successful then the V2X control may send the RSU address or address prefix(es) to the V2X WTRU over the V3 interface. The V2X Control Function may also optionally perform the authorization check with the HSS during this procedure.

Figure 10:
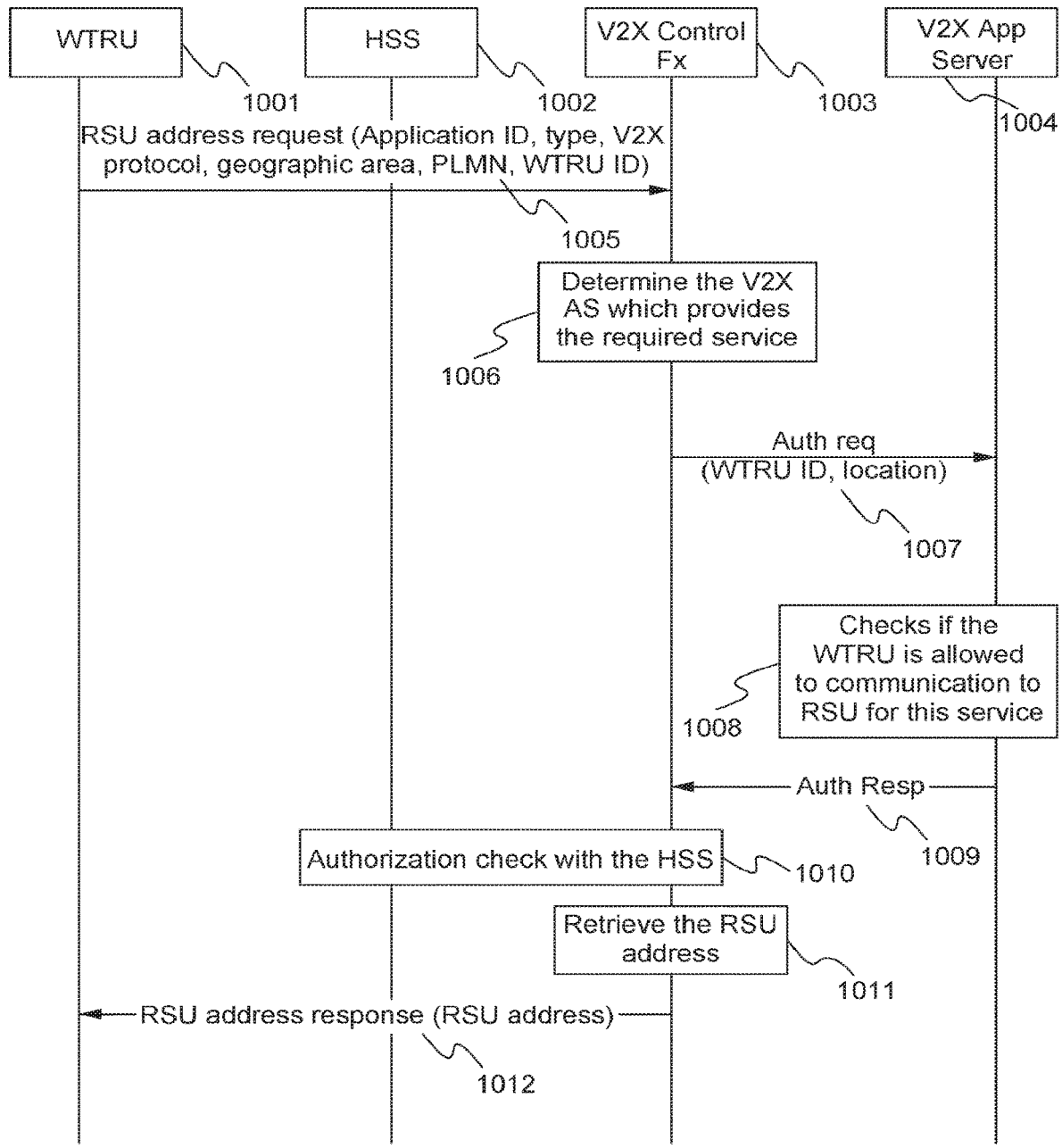
FIG. 10 is a diagram of an example V3 procedure to acquire an RSU address.

FIG. 10 is a diagram of an example V3 procedure to acquire an RSU address. At 1005 the V2X WTRU 1001 may send a V3 interface message to the V2X Control Function 1003 to request an RSU address. The message may contain one or more of: an application ID, a WTRU ID, an application type, a V2X protocol type (e.g., SPAT), information about a geographic area the WTRU is located in, the PLMN the WTRU is camped on, an indication about a home operator, and the like.

At 1006, upon receiving the RSU request from the V2X WTRU 1001, the V2X Control Function 1003 may determine which V2X Application Server is responsible for providing the required V2X service. At 1007, the V2X Control Function 1003 may send a V2 interface message to the V2X Application Server to check if the WTRU 1001 is authorized to use that application or access the RSU which provides that service. This message may include WTRU ID and/or location information about the V2X WTRU 1001.

At 1008 the V2X Application Server may perform the authorization check based on the parameters received at 1007. At 1009, the V2X Application Server may respond with an Authorization response message.

The HSS authorization part at 1010 of this procedure between the V2X Control Function 1003 and the HSS 1002 may be similar to that shown in the example of FIG. 9. If the authorization(s) is successful, the V2X Control Function 1003 may retrieve the RSU address(es) or prefix(es) at 1011. At 1012 the V2X Control Function 103 may send the RSU address(es)/prefix(es) in the RSU address response message over the V3 interface to the WTRU 1001.

In an alternative, if a V2X Control Function does not have the local Application Server address, it may contact the V2X Application Server in macro network to request the address of the local Application Server. For such a retrieval process the V2X Control Function may send the geographic area information/location information of the local area whose local V2X Application Server the V2X WTRU is requesting the address for.

In another alternative, the process described with relation to FIG. 10 may differ by performing fewer or additional actions. For example, a V2X Control Function may decide not to perform authorization with an HSS. Once the V2X WTRU receives the RSU address, this address may be used by the WTRU as a destination address in a PC5 message for a particular RSU.

In another alternative, a WTRU may receive the source address of the RSU. In that case, the V2X WTRU may filter out all the received PC5 broadcast messages based on the received source RSU address. The WTRU may only pass on the PC5 message to the upper layers whose source address matches the RSU source address received previously.

In certain emergency situations, low latency or out of coverage scenarios, certain RSU addresses may be provided to a WTRU as part of a configuration. These addresses may be source addresses, destination addresses, or both. For such emergency or safety applications, the WTRU may perform procedures different than those described in FIG. 10 or 9. The WTRU may just use the configured RSU address to send the PC5 message or the configured source address may be used to filter out the PC5 message which may be broadcasted by various RSUs in the vicinity of the V2X WTRU. When the V2X WTRU broadcasts a PC5 message, any RSU receiving the message may be able to infer that the broadcasted message is an emergency message based on the characteristics of the address. The emergency address may be a special address known to RSUs. Therefore, the RSU may be able to take the appropriate action upon receiving the message with an emergency destination address. For example, the RSU may rebroadcast the message with high priority and/or forward the message to the V2X Application Server. Similarly, the V2X WTRU may also be able to receive a PC5 message with the emergency address.

The eNB type RSU as illustrated in FIG. 5 consists of an eNB with a LGW that may interface with a V2X application. To be able to connect to the V2X application via eNB type RSU, the WTRU may need to have a SIPTO connection with the LGW. Therefore, in one example, similar procedures as described in FIG. 9 and FIG. 10 may be used by the V2X WTRU to retrieve the APN to be used for a SIPTO PDN connection with eNB RSUs. The RSU address may be sent to the WTRU by either a V2X Application Server or a V2X Control Function because the eNB type RSU address may be an APN for the SIPTO PDN connection. Such an APN provision by the V2X Control Function or the V2X Application Server may be applicable to both RSUs operating in normal E-UTRAN mode or operating in isolated E-UTRAN mode with a local EPC.

When the WTRU receives an APN in the RSU address response message, it may know that it needs to connect to an eNB type RSU and, therefore, may send a PDN connection request which includes the received APN. The WTRU thus may be able to create a PDN connection with the RSU and may be able sent a V2X message to that RSU via the SIPTO PDN connection.

In on example, an eNode-B type RSUs may broadcast the services they provide and possibly APNs corresponding to those services in the SIB messages. The V2X WTRU may read those SIBs and request connection with the RSUs the V2X WTRU is interested in.

FIG. 5 may be used to demonstrate one specific example of an eNB based on the SIPTO LGW architecture. There may however be other possible implementations for eNB type RSUs. One such implementation may be based on eMBMS or local eMBMS architecture.

Figure 11:
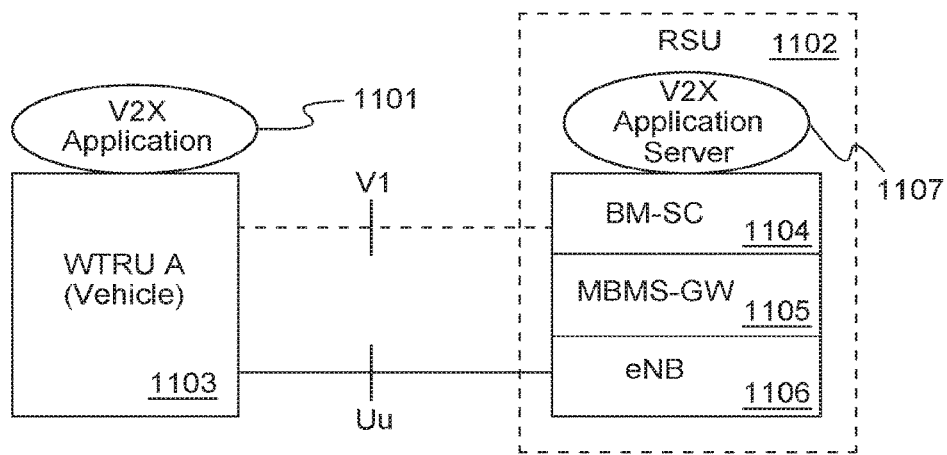
FIG. 11 is a system diagram of an example of an eNode-B type RSU supporting local MBMS.

FIG. 11 is a system diagram of an example of an eNB type RSU supporting local MBMS. FIG. 11 shows an example eNB type RSU 1102 including a MBMS-GW 1105, a BM-SC 1104 and a V2X Application Server 1107. The MBMS-GW 1105 and the BM-SC 1104 may either be collocated with the eNB 1106 or standalone nodes. A WTRU A 1103, such as a vehicle, may run an instance of a V2X Application 1101. The WTRU A 1103 may communicate with the RSU 1102.

For an eNB type RSU, the RSU address may be a TMGI or Service area ID which may be sent to the V2X WTRU as described by the procedures above herein. The V2X WTRU may then look for the specific TMGI corresponding to the V2X service it may be interested in.

In one embodiment, the uplink messages may need to be addressed to a particular RSU and the WTRU may need to obtain the RSU address for the transmission of uplink messages. The USD (User Service Description) information received by the WTRU for receiving downlink messages may also contain information about the uplink RSU address. Such USD information may be sent to the WTRU via short message service (SMS), SIB broadcast, or MBMS broadcast (such as a service announcement over a global or well-known TMGI) used for disseminating MBMS configuration information for specific MBMS or V2X services.

Figure 12:
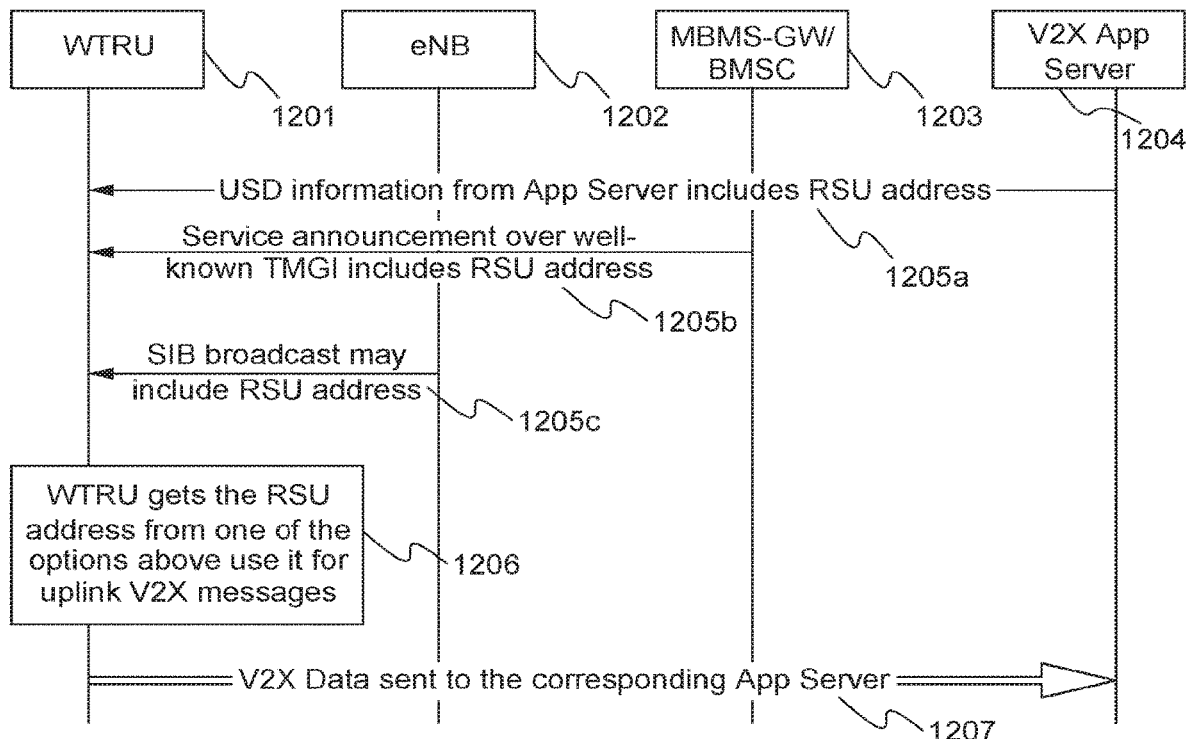
FIG. 12 is a diagram of an example procedure using options for acquiring an eNode-B based RSU address.

FIG. 12 is a diagram of an example procedure using options for acquiring an eNB based RSU address. In the example shown in FIG. 12, the WTRU 1201 may obtain the RSU address or V2X Application Server address from one of the three illustrated options 1205a, 1205b, and 1205c shown. For 1205a, USD information received via SMS, wireless application protocol (WAP), or hypertext markup language (HTML) push messages and the like may include the RSU server address/V2X Application Server 1204 address. For 1205b, the V2X WTRU 1201 may be configured with the well-known TMGI used to monitor service announcement messages for various V2X services from the MBMS-GW/BMSC 1203; such a service announcement may also include information about the uplink RSU address/V2X Application Server address. For 1205c, the SIB broadcast may include the RSU address/V2X Application Server address from the eNB 1202.

After receiving the address, the WTRU 1201 may include the received address in the uplink V2X message at 1206. At 1207, the uplink V2X messages may get routed to the appropriate V2X Application Server 1204 based on the RSU address.

In one embodiment relating to a V2X communication system, there may be a geographic scope for a V2X message given that in at least one scenario a message may only relate to a specific geographic area. When the V2X WTRU, RSU or eNB transmits a message, it may only be applicable to a certain location. For instance, an accident report message may only be relevant in the vicinity of the area where the accident took place. If an accident took place, the V2X messages may be localized to a certain geographic scope relating to the accident. In another example, information about a traffic jam at location X may not need to be broadcasted at location Y. In yet another example, a distressed vehicle may only need to send out an SOS type message only in its surrounding location.

The system therefore may need to provide mechanisms for a V2X WTRU or RSU to be able to restrict the transmission or rebroadcast of certain messages to a particular geographic area. Further to this requirement, the geographic area may be of varying size such that that dissemination of the message to a particular area size may depend on the type of the message or even the contents of the message. V2X messages may be rebroadcast by various nodes in the V2X system, for example, V2X vehicles, V2X infrastructure, V2X RSUs, V2X pedestrians, and the like. However, this rebroadcast of messages may be restricted to a geographic area.

Figure 13:
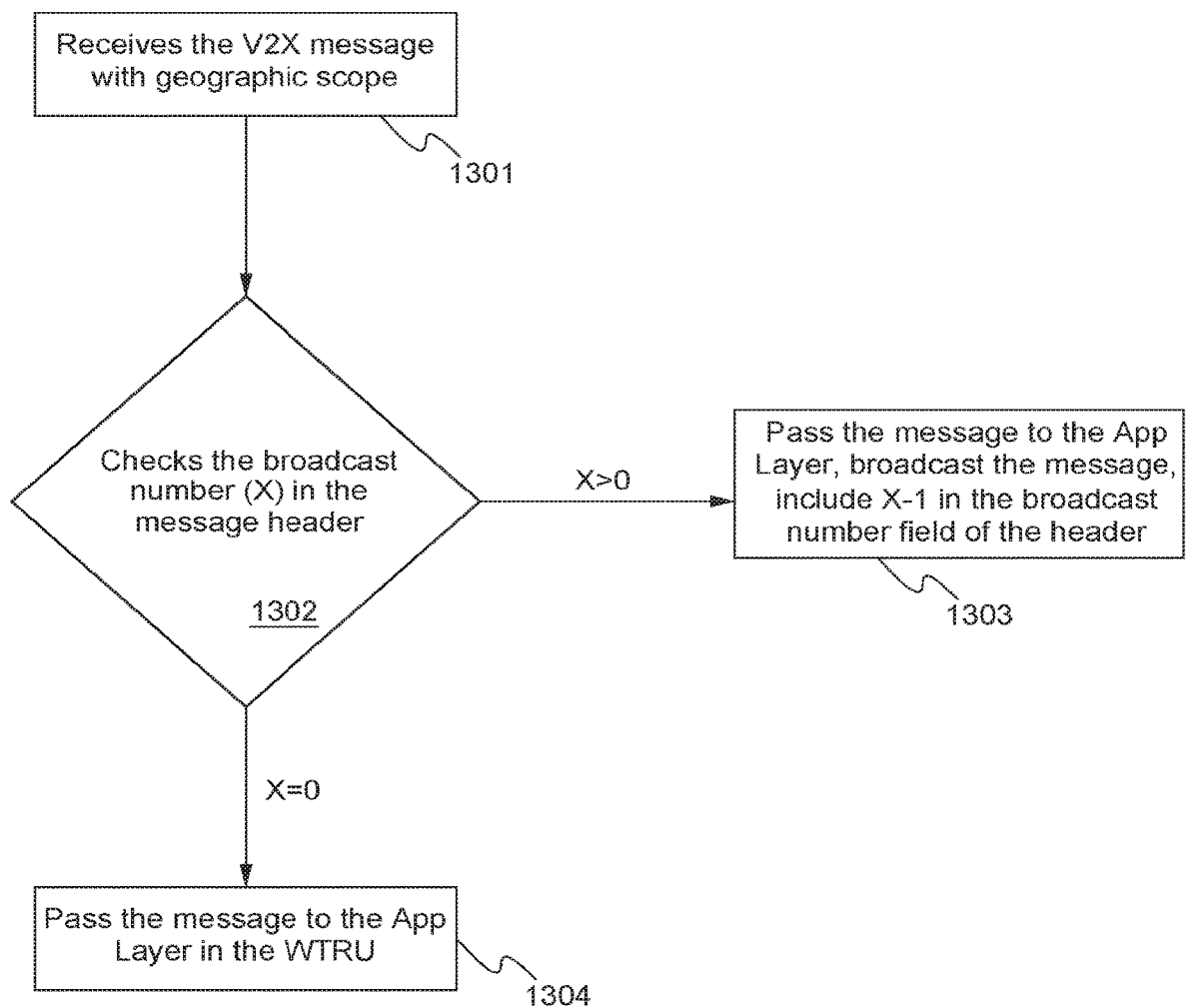
FIG. 13 is a diagram of an example procedure for restricting a message in a geographic location.

FIG. 13 is a diagram of an example procedure for restricting a message in a geographic location. At 1301 a V2X WTRU may receive a V2X broadcast message with a geographic scope. The received message header may contain a broadcast number. Every time the message is rebroadcast, a node that rebroadcasts the message may include the broadcast number e.g., 1 in the message header. At 1302 the receiver of the message may check the broadcast number in the message header. At 1303, the message is passed to the App layer and if the message header is greater than 0, the message may be broadcast again subtracting 1 from the number in the message header. At 1304 when the broadcast number is less than 0, the WTRU may just pass the message to the V2X application in the WTRU and not re-broadcast the message thereby confining the number of times the message is re-broadcast based on the number of times it has been received and re-broadcast.

The broadcast number may be configured at the WTRU during the initial V2X configuration or may be sent with to the WTRU during V2X RSU address procedure along with the RSU address as described earlier in this section. In an example, the broadcast number may be provided by the V2X Application Server or application layer in the WTRU as the application may be aware of the location and, therefore, may have enough information to decide how far the message should be broadcast.

In one example, a local eMBMS server may have certain MBMS functionality, such as userplane functionality, reside closer to the eNB or RAN node; these functions may be known as an LME and such a configuration may be seen in FIG. 7 as discussed herein. The V2X Application Server may need to send the DL MBMS messages to the LMEs for which the geographic scope of the message is intended. In such a scenario, the V2X Application Server may send the list of MBMS Service area IDs/cell IDs to the BM-SC for the service areas for which the downlink V2X message is intended; this case may be based on the assumption that the V2X Application Server is configured with either a list of cell IDs or MBMS Service Area IDs (SAIs). The BM-SC may then select one or more LMEs based on the received cell IDs or MBMS SAIs.

Figure 14:
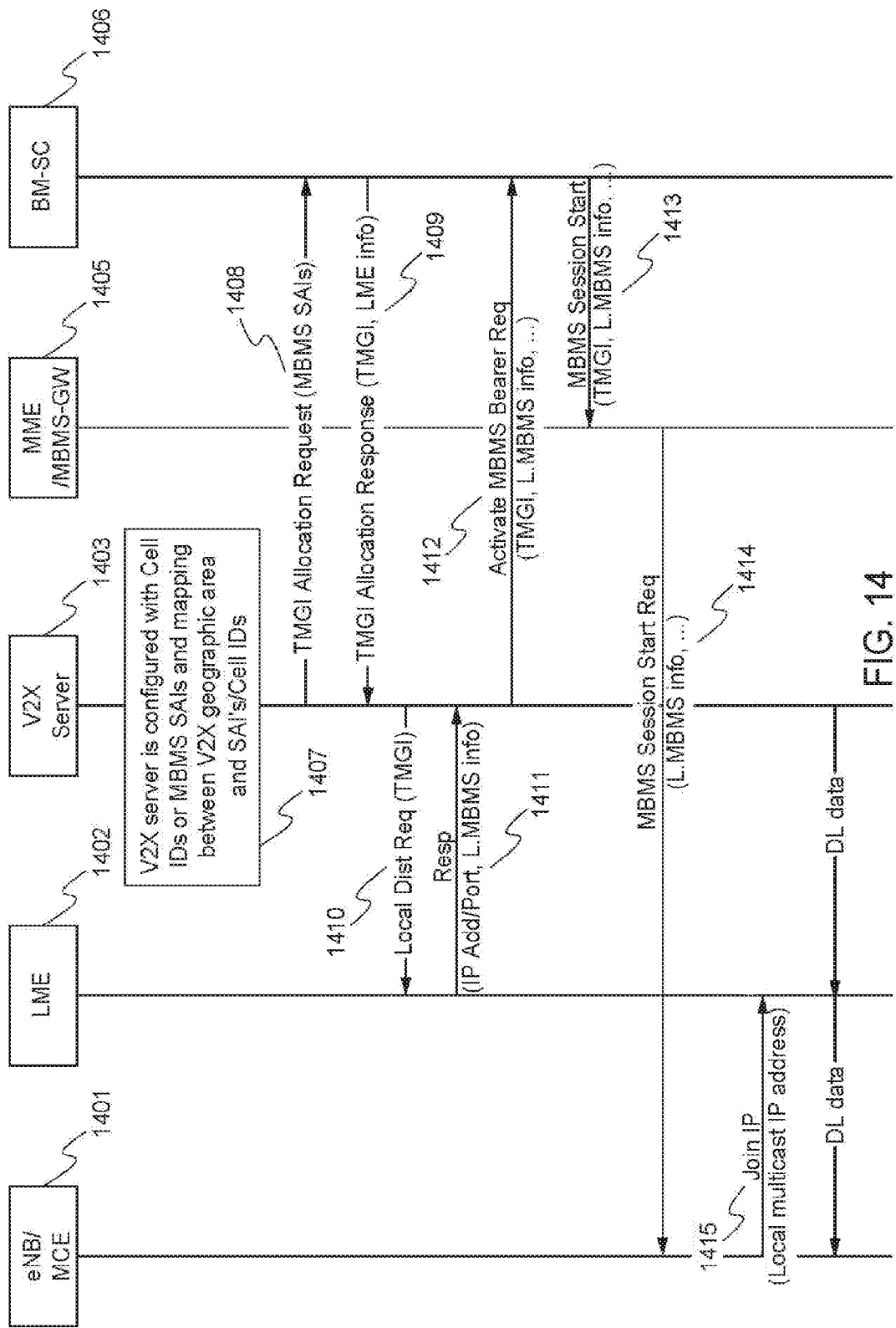
FIG. 14 is a diagram of an example procedure for selecting one or more local MBMS entities (LMEs) based on received cell identities (IDs) or MBMS Service Area IDs (SAIs).

FIG. 14 is a diagram of an example procedure for selecting one or more LMEs based on received cell IDs or MBMS SAIs. At 1407 the V2X Application Server 1403 may be configured with Cell IDs or MBMS SAIs and possibly mapping between the V2X geographic area and SAIs/Cell IDs. At 1408 the V2X Application Server 1403 may send a TMGI allocation request message to the BM-SC 1406, which includes the SAIs of the area where the V2X Application Server 1403 is interested in broadcasting the message. At 1409, based on the received MBMS SAIs, the BM-SC 1406 may send the information about the LME 1402 that serves the area of interest to the V2X Application Server 1403. The LME information may be the IP address of the LME, LME Identifier, and the like. The V2X Sever 1403 may be preconfigured with LME information (e.g. FQDN or IP address for the LME). When there is a need to establish delivery path for V2X message, the V2X Server 1403 initiates at 1410 Local Distribution Request procedure with the LME 1402. This message may include TMGI as an identifier. At 1411 the LME 1402 may reply with the Local Distribution Response message including the IP address/port in LME for receiving the data, and the associated information of Local MBMS Distribution, e.g., IP Source Address, and IP Multicast Address in LME for IP multicast distribution. In LME, there may be a 1:1 mapping between the IP address/port for receiving the data, and the associated IP source address/IP Multicast address. At 1412 the V2X Server 1403 may initiate Activation MBMS Bearer Request procedure, where the message of the procedure may include information of Local MBMS Distribution (IP Multicast address). At 1413 the BM-SC may initiate MBMS Session Start procedure where upon the reception of the information of Local MBMS Distribution the MME/MBMS-GW 1405 may skip the normal processing for IP multicast distribution, e.g. allocate an IP multicast address. At 1414 the MBMS Session Start Request message is sent from the MME/MBMS-GW 1405 to MME (not shown) where it is forwarded to the eNB/MCE 1401. At 1415 the eNB 1402 joins the IP Multicast group in the LME 1402. Now Thereafter the LME 1402 may send V2X Data via the IP/port address received previously.

In another example, when the BM-SC receives the MBMS SAIs in a TMGI monitoring request message or a similar message, it may include the preference for local eMBMs. The BM-SC may then retrieve the LME info based on receiving the BM-SC and directly trigger the local LME to start the MBMS session.

In a system for V2X communication, V2X messages containing data may be sent over the control plane. Specifically, in one example, V2X data may be sent over PC5 signaling (PC5-S) (a PC5 control plane in the case of PC5 communication). In another example, for the case of a Uu interface, the V2X data may be sent over a Signaling Radio Bearer (SRB), e.g., in a radio resource control (RRC) message to the eNB.

PC5-S messages may be exchanged between the ProSe Protocol Layers (V2X Control Layers) of the WTRUs. The V2X application may interface with the ProSe protocol layer or V2X layer in the WTRU to send V2X messages over the PC5-S. The ProSe protocol layer may include certain information in the header of the PC5-S message to indicate that the message contains data or particularly the type V2X data (SPAT, WSMP, and the like). At the PDCP layer of the transmitting WTRU, the SDU may be labeled or the PC5-S codepoint for the SDU may be used. PC5-S messages passed down to the lower layer in the transmitting WTRU may have an associated priority based on the priority determination procedures described herein. Alternatively, such a PC5-S message (which may contain V2X data) may always receive the highest priority treatment by the lower layers in the WTRU.

At the receiver side, the PDCP may then check a code point and infer that it has received a PC5-S message. The message may therefore be passed onto the ProSe protocol layer (V2X Control Function). Upon examination of the PC-5 message at the ProSe Protocol layer it may be determined (based on the PC5-S header) that the message contains V2X data. The data part of the message may then be forwarded to the appropriate V2X application. For such steps to happen, additional information about the type of V2X application, application Id or V2X may be included in the PC5-S message.

V2X messages (both IP and non-IP) may also be sent over the Uu control plane while performing V2X services over the LTE air interface. The V2X application layer or facilitation layer may send the message directly to the access stratum, e.g., RRC or PDCP in the V2X WTRU. A new information element (IE) may be defined for the RRC message to indicate that the RRC message contains V2X data or special code point in the PDCP defined for such purpose.

When the eNode-B receives the RRC message with an indication that it contains V2X data or gleans from a PDCP header code point that a V2X data payload is contained in the message, it may not forward the control message to the MME via the S1-AP interface (which is the normal behavior). Instead the eNode-B may extract the V2X data from the control message and send it to the V2X Application Server either directly or via the LGW. As described earlier herein, the message may contain additional information about the application to assist the eNode-B to direct the message to the appropriate V2X AS.

In the DL direction, similar actions may be performed by the transmitting eNode-B and the receiving WTRU. The difference may be that eNode-B may receive the data directly from the Application Server, LGW or MBMS GW.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a wireless transmit receive unit (WTRU), the method comprising:
    receiving configuration information from a control function, wherein the configuration information includes quality of service (QoS) parameter mapping information for vehicle to everything (V2X) communication linking application information and priority information;
    determining a specific priority for a V2X packet based on application provided information and the configuration information received from the network; and
    sending a V2X packet based on the specific priority to a layer lower than the V2X layer.

2. The method of claim 1, wherein the configuration information further includes geographic information that includes geographic restrictions per V2X packet used in the sending of the V2X packet.

3. The method of claim 1, wherein the configuration information also includes per message bit rate requirements used to send the V2X packet.

4. The method of claim 1, wherein the configuration information is received from a V2X Server and takes precedence over other priority information.

5. The method of claim 1, wherein the configuration information further includes a Layer 2 ID that is used in the sending of the V2X packet.

6. The method of claim 1, wherein a V2X layer determines the specific priority and an Access Stratum layer performs the sending.

7. The method of claim 1, wherein the V2X packet is sent over a PC5 link.

8. A wireless transmit receive unit (WTRU), the WTRU comprising:
    a processor operatively connected to a transceiver, the processor and transceiver configure to receive configuration information from a control function, the configuration information including quality of service (QoS) parameter mapping information for vehicle to everything (V2X) communication linking application information and priority information;

the processor and transceiver configured to determine, at a V2X layer, a specific priority for a V2X packet based on application provided information and the configuration information received from the network; and the processor and transceiver configured to send the V2X packet based on the specific priority to a layer lower than the V2X layer.

9. The WTRU of claim 8, wherein the configuration information further includes geographic information that includes geographic restrictions per message used for sending the V2X packet.

10. The WTRU of claim 8, wherein the configuration information also includes per message bit rate requirements used to send the V2X packet.

11. The WTRU of claim 8, wherein the configuration information is received from a V2X Server, and takes precedence over other priority information.

12. The WTRU of claim 8, wherein the configuration information further includes a Layer 2 ID that is used in the sending of the V2X packet.

13. The WTRU of claim 8, wherein a V2X layer determines the specific priority and an Access Stratum layer performs the sending.

14. The WTRU of claim 8, wherein the V2X packet is sent over a PC5 link.

15. A method implemented by a wireless transmit receive unit (WTRU), the method comprising:

receiving configuration information from a control function of a network, wherein the configuration information includes quality of service (QoS) parameters mapping information for a V2X message; and sending the V2X message over a PC5 link based on the QoS parameters mapping information to a layer lower than a V2X layer.

16. The method of claim 15, wherein a V2X application of the WTRU provides the V2X message to a V2X layer of the WTRU, wherein the V2X layer performs the determining of a specific priority and a specific bit rate, and wherein the V2X message is associated with the specific priority and specific bit rate.

17. The method of claim 15, wherein the configuration information further includes geographic information that includes geographic restrictions per message that is used in the sending of the V2X message.

18. The method of claim 15, further comprising determining, at the V2X layer, a specific priority for the V2X message based on the configuration information.

* * * * *